United States Patent
Herbach et al.

(10) Patent No.: US 8,611,544 B1
(45) Date of Patent: Dec. 17, 2013

(54) SYSTEMS AND METHODS FOR CONTROLLING ELECTRONIC DOCUMENT USE

(75) Inventors: Jonathan Herbach, Mountain View, CA (US); Chetan Mehrotra, Indirapuram Ghaziabad (IN); Varun Sharma, New Delhi (IN); Shadkam Islam, Nodia (IN)

(73) Assignee: Adobe Systems Incorporated, San Jose, CA (US)

( * ) Notice: Subject to any disclaimer, the term of this patent is extended or adjusted under 35 U.S.C. 154(b) by 91 days.

(21) Appl. No.: 13/013,368

(22) Filed: Jan. 25, 2011

(51) Int. Cl.
*H04L 29/06* (2006.01)

(52) U.S. Cl.
USPC ............. 380/279; 726/1; 726/27; 713/165

(58) Field of Classification Search
USPC ................. 380/277–279; 726/1, 17, 21, 27; 713/165
See application file for complete search history.

(56) References Cited

U.S. PATENT DOCUMENTS

| | | | |
|---|---|---|---|
| 5,872,849 A | 2/1999 | Sudia | |
| 6,314,425 B1 | 11/2001 | Servinis et al. | |
| 6,449,721 B1 * | 9/2002 | Pensak et al. | 713/171 |
| 6,584,466 B1 | 6/2003 | Serbinis et al. | |
| 7,174,332 B2 | 2/2007 | Baxter et al. | |
| 7,614,077 B2 * | 11/2009 | Brew et al. | 726/1 |
| 8,065,713 B1 | 11/2011 | Vainstein et al. | |
| 8,095,790 B2 | 1/2012 | Takashima | |
| 2002/0016846 A1 | 2/2002 | Ono | |
| 2002/0032658 A1 | 3/2002 | Oki et al. | |
| 2002/0099947 A1 * | 7/2002 | Evans | 713/193 |
| 2003/0023559 A1 | 1/2003 | Choi et al. | |
| 2003/0110131 A1 * | 6/2003 | Alain et al. | 705/51 |
| 2004/0171399 A1 | 9/2004 | Uchida et al. | |
| 2004/0196978 A1 | 10/2004 | Godfrey et al. | |
| 2006/0255123 A1 * | 11/2006 | Gilfix | 235/380 |
| 2007/0127719 A1 | 6/2007 | Selander et al. | |
| 2007/0172053 A1 * | 7/2007 | Poirier | 380/28 |

(Continued)

FOREIGN PATENT DOCUMENTS

| | | |
|---|---|---|
| JP | 2001060944 | 3/2001 |
| WO | 2006109640 | 10/2006 |

OTHER PUBLICATIONS

Non final Office Action in related U.S. Appl. No. 13/013,282, dated Apr. 5, 2013, 18 pages.

(Continued)

*Primary Examiner* — Hadi Armouche
*Assistant Examiner* — Christopher C. Harris
(74) *Attorney, Agent, or Firm* — Kilpatrick Townsend & Stockton LLP

(57) ABSTRACT

One exemplary embodiment involves receiving, at a server, a request for a document key for accessing a document on a client device, wherein the request comprises an identity of an access policy and information about the document. The exemplary method further comprises determining, at the server, whether access to the document is permitted according to the access policy. If access to the document is permitted, the exemplary method involves computing, at the server, the document key using the information about the document, wherein the document key is document specific, wherein, prior to the computing of the document key, the document key is not stored for access by the server. The exemplary method further involves responding to the request by providing the document key for use in accessing the document on the client device.

18 Claims, 4 Drawing Sheets

(56) References Cited

U.S. PATENT DOCUMENTS

| | | |
|---|---|---|
| 2008/0130899 A1 | 6/2008 | Iwamoto et al. |
| 2008/0137842 A1 | 6/2008 | Everett et al. |
| 2008/0232598 A1 | 9/2008 | Vennelakanti et al. |
| 2008/0250245 A1 | 10/2008 | Sanderson et al. |
| 2009/0205017 A1* | 8/2009 | Yabe ............... 726/1 |
| 2009/0257596 A1* | 10/2009 | Piccinini et al. ......... 380/279 |
| 2009/0307504 A1 | 12/2009 | Ishikawa et al. |
| 2010/0023997 A1* | 1/2010 | Hu et al. ............... 726/1 |
| 2010/0030798 A1 | 2/2010 | Kumar et al. |
| 2010/0161962 A1 | 6/2010 | Lim |
| 2010/0185704 A1 | 7/2010 | George et al. |
| 2010/0235649 A1* | 9/2010 | Jeffries et al. ............ 713/189 |
| 2010/0293379 A1 | 11/2010 | Nie |
| 2011/0158405 A1 | 6/2011 | Choi et al. |
| 2011/0194698 A1 | 8/2011 | Asano et al. |
| 2011/0249816 A1 | 10/2011 | Choi et al. |
| 2012/0066744 A1 | 3/2012 | Knox |
| 2012/0137130 A1 | 5/2012 | Vainstein et al. |

OTHER PUBLICATIONS

Lamport, L., "Password Authenitcation with Insecure Communication", Nov. 1981, Communications of the ACM, vol. 24, No. 11, pp. 770-772.

* cited by examiner

300

RECEIVE A REQUEST FOR A DOCUMENT KEY FOR ACCESSING A DOCUMENT, THE REQUEST INCLUDING AN IDENTITY OF AN ACCESS POLICY AND INFORMATION ABOUT THE DOCUMENT
310

DETERMINE WHETHER ACCESS TO THE DOCUMENT IS PERMITTED USING THE IDENTITY OF THE ACCESS POLICY
320

COMPUTE THE DOCUMENT KEY USING THE INFORMATION ABOUT THE DOCUMENT
330

RESPOND TO THE REQUEST BY PROVIDING THE DOCUMENT KEY
340

FIGURE 3

SYSTEMS AND METHODS FOR CONTROLLING ELECTRONIC DOCUMENT USE

FIELD

This disclosure relates generally to computer software and more particularly relates to controlling the use of and access to electronic documents.

BACKGROUND

There are various techniques available to control the use of text, graphics, computer aided designs and other electronic documents. In many circumstances, it is desirable to ensure that a given document can only be used by one or more specific persons. Additional limitations on use are also often desirable. For example, a particular person's use of a document may be limited with respect to time of use such that that person can only use the document until a specified date. As another example, a person's use of a document may be limited with respect to type of use such that the person can view the document but cannot edit, copy, or print the document.

Documents are commonly encrypted to ensure that unauthorized persons cannot access the contents of the document. Distribution of the encryption keys that allow use of such encrypted documents can be controlled in various ways. Such encryption keys can, for example, be maintained at a separate network location and accessed by remote client devices when an authorized person attempts to use a document. The client device can send the person's credentials to a remote server, receive an encryption key from the remote server, and use that key to access the document. The person using the client device may be unaware of this process and may not have access to the provided encryption key. For example, the person may simply enter a username and password and the client device application may use that information to access the server, obtain the key, and open the document for the person to use. The remote server may have also provided particular policy information that defines how that person may use the document. The client device may receive this policy information and enforce the policy details, for example, by preventing the person from editing the document.

Existing servers that maintain document encryption key and policy detail information for documents require the storage and use of information about each individual document. For example, a database is used to store one or more records for each document that identifies whether a particular person has access to the document and defines the particular uses for which the person has permissions. One deficiency of such systems is that they can require a large amount of storage and communication. The storage and communication requirements can require significant resources particularly in circumstances in which the number of documents and persons is very large. As a particular example, if a service provider sends out monthly statements to hundreds of millions of customers where each such document requires a record in a database, the volume of storage and communication can be particularly burdensome.

SUMMARY

One exemplary embodiment involves receiving, at a server, a request for a document key for accessing a document on a client device, wherein the request comprises an identity of an access policy and information about the document. The exemplary method further comprises determining, at the server, whether access to the document is permitted according to the access policy. If access to the document is permitted, the exemplary method involves computing, at the server, the document key using the information about the document, wherein the document key is document specific, wherein, prior to the computing of the document key, the document key is not stored for access by the server. The exemplary method further involves responding to the request by providing the document key for use in accessing the document on the client device.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where:

FIG. 3 is a flow chart illustrating an exemplary method of controlling access to a document.

DETAILED DESCRIPTION

Figure 1:
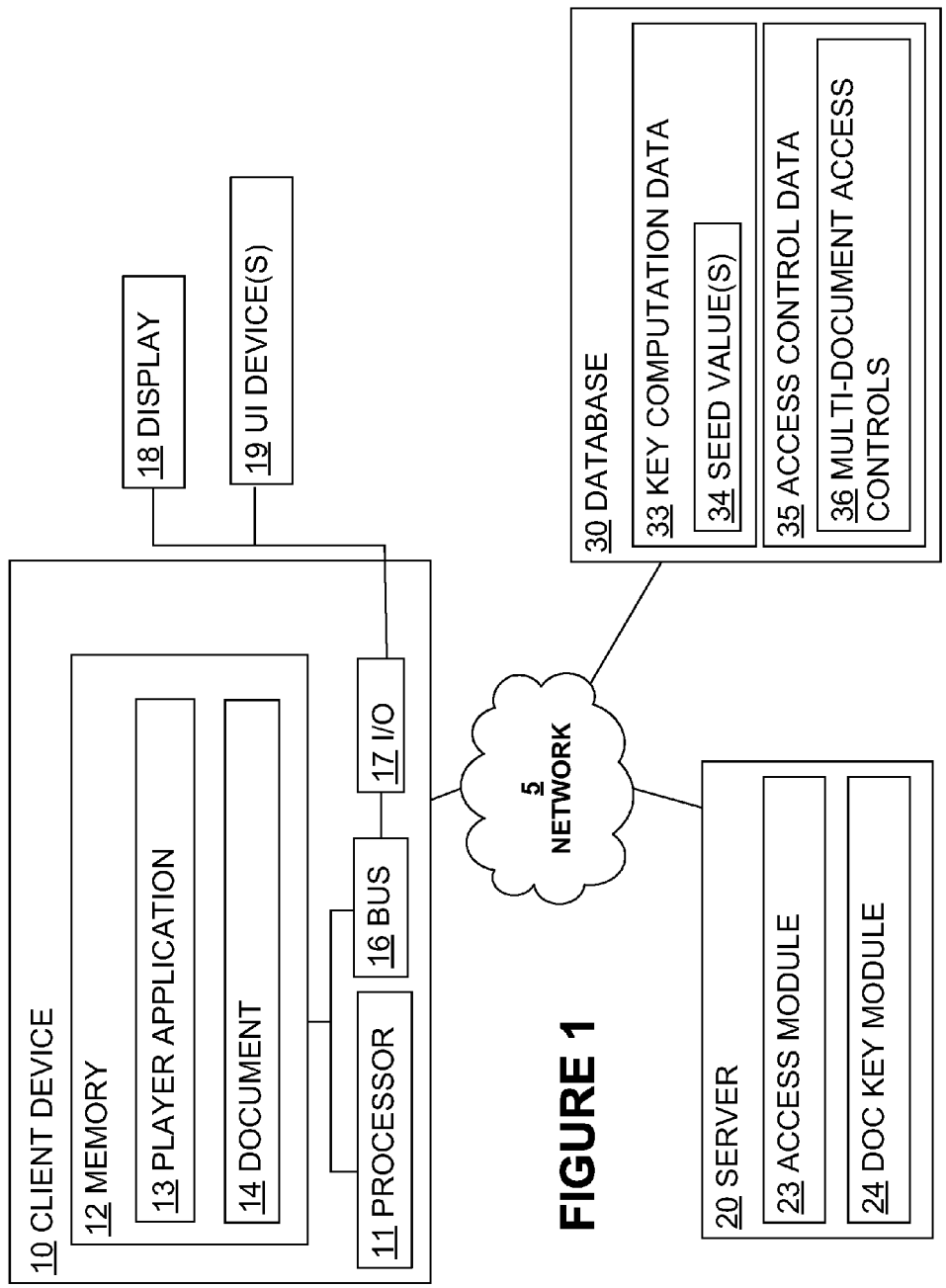
FIG. 1 is a block diagram depicting exemplary computing devices in an exemplary computing environment for implementing certain embodiments.

Improved systems and methods for controlling document use are disclosed. Document encryption keys can be used to control access to documents. In one embodiment, when a document is accessed on a client device, the client device requests the corresponding document key from a server to gain access to the document. The server responds to the request by confirming that access to the document is allowed by the requester and computing and returning an appropriate document key. A server may store only limited information or even avoid storing any information for use in access determinations and document key computations. For example, rather than storing document-specific access control information and other document-specific information, a server may store more limited information that is applicable to multiple documents.

Determining whether to allow access to the document or not can be based on information received in a request in addition to, or instead of, being based upon information stored by a server device performing that determination. For example, a request to access a document may include information about the particular document license information and information about the person requesting access that can be compared or otherwise used to determine whether to allow access to the document or not.

Computing a document key may similarly be based upon limited or no information stored by the server. Such a computation may use information received in the document access request rather than, or in addition to server stored information. In one exemplary embodiment, a document key is computed using document information, a timestamp, a policy identification and a user identification of a user who is requesting access to or use of the protected document. A system may be configured to require some or all of such information for the computation of a document key such that the document key and therefore access to and use of the document can not be obtained without the required information.

In one exemplary embodiment, a server stores one or more seed values that are each used to compute document keys for multiple documents, for example, by providing a seed value used in generating a random number that is used for, or as part of, the document key. Given a particular seed value and/or other document information a serve may compute a document key in a way such that given those same inputs the same document key can be recreated at a later time. Thus, when a document is first secured the document key can be computed using one or more of those inputs and when the document is later accessed, the same document key can be computed again using those same inputs. Generally, a server can use the same technique and/or inputs to compute a document key to allow access to document as was used previously to compute the same document key when the document was created and first secured using the document key.

Document keys, even document keys computed using a given seed value, may be the same or different for multiple documents. Document keys may be computed such that each document is secured by and accessed with a unique document key. If document keys are unique for each document or otherwise differ from one another from document to document, such differences in document keys can be based on information received in a request to secure or access the document in addition to, or instead of, being based upon information stored by a server device. For example, a request to access a document may include information about the individual document such as a unique document identifier, document descriptive information, license information, information about the context in which the document was first secured, information about a policy used to secure the document, and information about the time and date when the document was secured, etc. In attempting to access a document, such information may have been retrieved by a client device from the metadata or other unprotected portion of the document itself. The document-specific information that is used to compute an appropriate document key thus need not be stored or separately accessed by a server to compute a document key. In one embodiment, document keys can be computed to differ from one another in meaningful ways even though limited or no document-specific information is stored by the document key providing server.

These illustrative examples are given to introduce the reader to the general subject matter discussed here and are not intended to limit the scope of the disclosed concepts. The following sections describe various additional embodiments and examples with reference to the drawings in which like numerals indicate like elements.

Referring now to the drawings, FIG. 1 is a block diagram depicting exemplary computing devices in an exemplary computing environment for implementing certain embodiments. Applications, documents, and other electronic content executes or is otherwise used on the exemplary computer devices 10, 20, 30 and are shown as functional components or modules. As is known to one of skill in the art, such applications and content may be resident in any suitable computer-readable medium and execute on any suitable processor. For example, as shown the network device 10 comprises a computer-readable medium such as a random access memory (RAM) 12 coupled to a processor 11 that executes computer-executable program instructions and/or accesses information stored in memory 12. Such a processor 11 may comprise a microprocessor, an ASIC, a state machine, or other processor, and can be any of a number of computer processors. Such a processor can comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The device 10 may also comprise a number of external or internal devices such as a mouse, a CD-ROM, DVD, a keyboard, a display, audio speakers, one or more microphones, or any other input or output devices. For example, device 10 is shown with a display 18 and various user interface devices 19. A bus, such as bus 16, is included in the device 10. Device 10 could be a personal computing device, a mobile device, or any other types of electronic devices appropriate for providing one or more of the features described herein.

As used herein the terms "document" and "electronic document" refer to any electronic content that can be displayed, executed, or otherwise used on an electronic device to provide content. A document or electronic document may comprise one or more electronic files that may be stored on and/or transferred between electronic devices. Exemplary content of a document or electronic document may comprise text, graphics, audio, video, and any other content. A document may be presented or otherwise used on an electronic device in a variety of ways.

As used herein, the term "player application" refers to any application used to play or otherwise use a document on an electronic device. A document may be played or used through various types of player applications including, but not limited to, word processing applications, audio playing applications, video playing applications, rich Internet application players, and Internet browser applications.

As used herein, the term "document key" refers to any value, identifier, or other information useable to control access to a document. A document key may or may not be used to encrypt a document such that the document key is required to decrypt the document to gain access to some or all of the content of the document.

As used herein, the term "client device" refers to any electronic device that attempts to obtain a document or access to a document from a server device that provides the document and/or access to the document.

As used herein, the term "computing" refers to determining a value based on one or more inputs. For example, computing a document key may involve using an algorithm, function, or some other process that uses user information, document information and seed values.

As used herein, the terms "policy" and "access policy" refer to a record or other information about the rights of users with respect to accessing and using a document. An access policy can be used to determine if permission to a document can be granted and may be periodically or otherwise updated.

As used herein, the term "license" refers to an association of a policy with a particular document or documents and a user or users who may access and use that document. Thus, a policy can be applied to a particular document or documents to create a license.

As used herein, the term "user" refers to a person accessing, using, or attempting to access and use a document, unless otherwise expressly indicated. A person accessing, using, or attempting to access and use a document may or may not be the same person that originally secured or published the secured document.

As used herein, the term "document specific" refers to something being different for different documents. For example, a document specific document key is different than document keys computed for other documents. Document keys may be computed as document specific, for example, by computing document keys based at least in part on document specific information, such as information about a particular document received in a request to access that particular document.

FIG. 1 illustrates an exemplary client device 10 that comprises, in memory 12, a player application 13 and a document 14. A person using the client device 10 may desire to access the document 14 using the player application 13. For example, the person may execute the player application 13 and attempt to open the document 14 within the player application 13. However, access to the document 14 may be restricted such that the player application 13 cannot open the document without obtaining permission and/or an appropriate document key. In the exemplary computing environment of FIG. 1, such permission and/or document key may be sought by the player application 13 from server device 20, for example, by the client device 10 sending a request for permission and/or a document key to the server 20 through network 5.

The server 20 is illustratively shown as comprising an access module 23 and a document key module 24, which may reside in memory (not shown) and be executed using a processor (not shown) at the server 20. The access module 23 may respond to requests for access to documents by making one or more determinations using information in such requests. As an example, a request may request permission to allow access to a particular document. The access module 23 may make one or more determinations and access locally and/or remotely stored records to determine whether to allow such access or not. Similarly, document key module 24 may respond to requests for access to documents by computing a document key using information in such requests and/or by accessing locally and/or remotely-stored records.

In the exemplary computing environment of FIG. 1, server 20 via one or both of its access module 23 and document key module 24 is able to use database 30 to provide an appropriate response to a request for access to a document from the client device 10. Database 30 is shown as illustratively comprising key computation data 33 that illustratively includes a seed value(s) 34. One or more such seed value(s) 34 may be used, for example, in computing a document key that is used to secure and/or access document 14 on client device 10. Database 30 is further shown as illustratively comprising access control data 35 that illustratively includes multi-document access controls 36. An example of one these multi-document access controls 36 is a single record providing one or more access rules applicable to multiple documents. Such a single record may do so without individually identifying documents.

Other types of access control data can be used to achieve various access control objectives. Generally, access control data 35 may be defined in an efficient manner such that access module 23 and/or document key module 24 can utilize such information, possibly in combination with information otherwise known about documents, to control access to the documents in accordance with various access control objectives. Using document information that is otherwise known about a document can reduce the amount of information that needs to be stored to provide the desired access control functionality. Accordingly, the amount and/or type of information that is stored at database 30 or otherwise stored at a location accessible to server 20 can be less than it otherwise would without the use of information otherwise known about the document, e.g., without using information in the request for access to a document that identifies information about the document and/or context in which the document access is being attempted.

In one exemplary embodiment, when a server 20 is accessed by a client attempting to secure a document 14, the server 20 calculates a document key for securing the document 14 and returns that document key to the client device 10 that then encrypts or otherwise secures the document 14 using the document key. The client device 10 may also include information in the document 14 such as license information that identifies which access policy applies to each authorized user of the document. The document 14 may include this information by simply including a license identifier. In one exemplary embodiment, a license identifier comprises a policy identifier, a user identifier, and a timestamp.

To apply a security policy to a document 14, a client device 10 may send a request to apply the security policy to the document to a document-key-providing server, such as server 20. Such a server 20 may calculate the document key from information in the request. For example, prior to sending the request, the client device 10 may receive input from a person using the client device 10 and from that input identify a particular policy, user identity of a user that will access and use the document, and other information. Based on such input and a received command specifying that a security policy should be applied to the document 14, the client device 10 creates and sends a request that includes, as examples, a policy identifier, a user identifier, and a timestamp associated with the time when the request was made. Different policy identifiers and user identifiers may be provided for different persons who will be authorized to use the document 14. The request to apply the security policy may include the file name or other identifier of the document 14.

Figure 2:
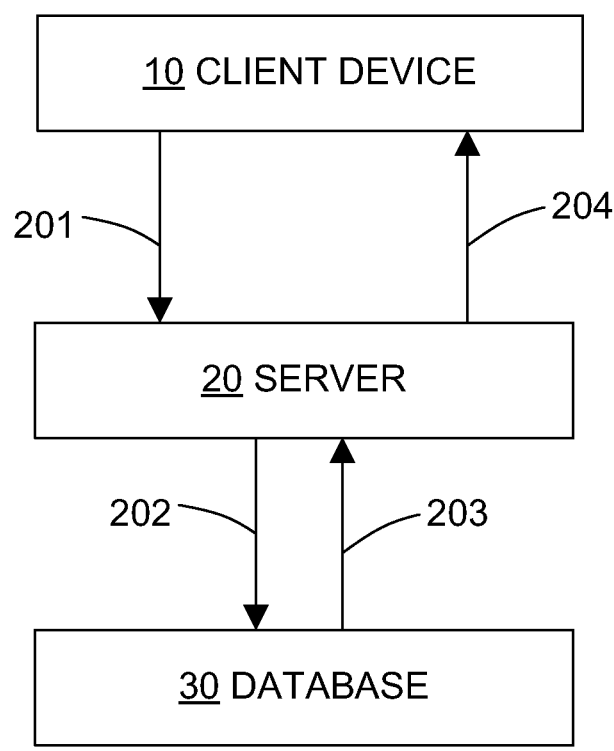
FIG. 2 is a flow chart illustrating an exemplary method of a flow of communications between electronic devices in the circumstance of a client device securing a document.

FIG. 2 is a flow chart illustrating an exemplary method of a flow of communications between electronic devices in the circumstance of a client device 10 securing a document 14. In this exemplary embodiment, client device 10 accesses server 20 to attempt to secure a document 14, of FIG. 1. The client device 10 initiates such a request by sending a request 201 to secure the document 14 to the server 20. Request 201 may or may not include a copy of the document 14 itself and may or may not include additional information. In one exemplary embodiment the request 201 identifies a person or persons that will be allowed to access the document 14 after security has been applied to the document 14.

In response to receiving request 201, server 10 computes a document key for securing the document 14 and sends a message 204 returning that document key to the client device 10 that then encrypts or otherwise secures the document 14 using the document key. In an alternative embodiment, the request 201 includes the document and the server 20 encrypts or otherwise secures the document using a document key and returns the secured document in message 204 to the client device 10.

Information in the request 201 from the client device 10 may be used by the server 20 to compute a document key. A document key may be computed without the server 20 accessing a database 30. A document key may be computed based on information such that, given the same information, the same document key can be recreated by the server 20. In one exemplary embodiment, information provided in the request 201 is simply concatenated together to form a unique document key. In another exemplary embodiment, a function is applied to such information to create the document key. In yet another exemplary embodiment, additional or alternative information is also used in creating the document key. For example, a document key may involve computing a random number using a particular seed value. The random number can be included as part of or otherwise used in creating the document key.

To compute the document key that is used to secure the document, server 20 may use information in request 201 such as an identity of an access policy and/or information about the document 14. In one embodiment, the server 20 accesses database 20 through messages 202 and 203 to obtain a seed value. In one embodiment, the server 20 does not store the created document key since the document key can be recreated to control future access to the document 14. Not having to store individual document keys for all documents may provide efficiency and various other advantages. Embodiments that avoid or limit storage of document-specific keys and access control information are particularly useful in contexts involving millions and even billions of documents that are created for access by a more limited number of users to individually access can particularly benefit from not having to store document access and/or document key information for each such document.

A server 20 calculating a document key can involve accessing some information stored in a database 30. Even though some database 30 access may be used, in one embodiment, a document key is created without the server 20 creating or accessing document-specific information stored in a database 30 or otherwise stored by the server. As a specific example, a server 20 may retrieve seed value(s) 34 (FIG. 1) from a database 30 to compute a random number for use as part of the document key. A single seed value 34 may be used for multiple documents. In one particular example, the database 30 or other storage medium has only twenty six seed values as seed value(s) 34, such that each of the twenty-six is associated with a particular alphabet character. In one exemplary use of such seed value(s) 34, a first seed value is used for computing document keys for requests associated with a user identifier (e.g., a user name of a user for whom the license is being created to allow access and use of the document) beginning with the character "a", a second seed value is used for computing document keys for requests associated with a user name beginning with the character "b", etc. Based upon the user credentials of a user for whom a license has been created using a policy, one can obtain the seed value in a formulaic manner or obtain it from a database 30 or other location where seed values are stored in a limited set of records. A variety of techniques may be used so that seed value(s) 34 and/or other information used in creating a document key is the same for multiple documents such that document-specific database or otherwise stored document-specific entries are not required to compute document-specific document keys.

In one exemplary embodiment, a server 20 responds to a request to apply the security policy to a document 14 by providing a document key and one or more license identifiers back to the client device 10 that initiated the request. Each such license identifier may associate a person or group of persons with one or more security policies. For example, a first person may be allowed to view, edit, and print a document 14 while another person may only be allowed to view the document 14. The client device 10 receiving such a document key and the one or more license identifiers may use the document key to encrypt or otherwise secure the document 14 and use the license identifiers to include information in the document 14. In one embodiment, the one or more license identifiers are included in an unsecured or unencrypted portion of the document 14.

Prior to sending a request 201 for a document key to use to encrypt or otherwise secure a document 14, a client device 20 may receive input for inclusion in the request 201 from a person using the client device 20 to attempt to access the document 14. In one exemplary embodiment, a document 14 is encrypted or otherwise secured such that information about the document 14, such as document identifying information, user identifying information, and/or license information, is accessible by the client device 10 without accessing other protected portions of the document 14, such as, a main portion of document content. In one exemplary embodiment, such unprotected information is stored as document metadata. In the context of later requests for access to the document 14, such information from the document 14 may be used by a server 20 to compute the same document key to allow the document 14 to be decrypted or otherwise accessed. Similarly, as another example, a statement distribution system may create monthly electronic statement documents and provide information about the document, the context in which the document was created and/or secured, the potential recipients of the document, etc. for use by the server 20 in computing an appropriate document key for the document 14.

One embodiment involves a server 20 uses information about a document 14 received in an access request to derive or otherwise compute a document key that will differ from document to document. This is particularly useful in the context in which the volume of documents is extremely high and where it may be desirable to avoid the requirement of having to store, for every document, access information or other information used to provide documents keys for each document. Thus, in one embodiment, the server 20 may only store information that is not document-specific. Little or no additional information needs to be stored since information about a document 14 received in an access request can instead be used to create and recreate the document keys for the different documents.

Document keys may be provided in accordance with document access rules that are applicable to multiple documents. For example, when a request for access to a document is received, a server 20 may identify a policy that defines document access rights applicable for multiple documents without identifying individual documents. The server 20 can thus respond to such a request by confirming that access to the document is allowed without having to store and/or access a database 30 or other storage records that provides document-specific access rights for all individual documents. The server 20 can thus generally avoid having to store document-specific access policy information for many or all of the individual documents for which access control is provided.

While a system may utilize limited or no storage of document-specific access information and/or other information, document-specific revocations and other features may be implemented using document-specific information available from elsewhere. Such document-specific information may be available at the time the document 14 is first secured based on user input, from the content of the document itself, and/or from the document creation environment, as examples. Such document information for a document 14 that has already been secured may be obtained from user input, from the document itself, or from the context in which access to the document 14 is being requested, as examples. For example, document identifying information may be available from metadata stored in a document 14 and used to control access to the document 14 by the server 20. In one embodiment, revocation of access rights is applied by storing some document-specific information at the server 20, such as the individual document numbers for documents for which document access has been revoked.

In one exemplary embodiment, when a server 20 is accessed by a client device 10 attempting to open a document 14, if the requester is authorized, the server 20 computes a document key for opening the document and returns that document key to the client along with policy details specifying what uses of the document 14 are permitted. The client device 10 then decrypts or otherwise opens the document 14 using the document key.

A client device 10 attempting to open a document 14 may receive authentication information as input from a person using the client device 10 and a command to open the document 14. The client device 10 may use this information and information from the document 14 itself, such as the document identifier and license information obtained from an unsecured portion of the document, to send a request for a document key to a server 20. In one embodiment, such a request includes authentication information for the person attempting to open the document 14, and license information from the document 14 where the license information includes a policy identifier, a user identifier of a user allowed to access and use the document, and a timestamp as described with respect to the exemplary license identifiers above.

FIG. 3 is a flow chart illustrating an exemplary method 300 of controlling access to a document. Such an exemplary method 300 is described in the context of the exemplary computing environment of FIG. 1. However, method 300 may be implemented in a variety of other computing environments, including environments that involve the use of mobile devices, environments that do not use databases, and environments that differ from the exemplary environment of FIG. 1 in various other ways. In short, the techniques and features described have a variety of uses and benefits and may be tailored, adjusted, or otherwise modified to fit the particular computing environment in which such techniques and features are implemented.

Exemplary method 300 comprises receiving a request for a document key for accessing a document 14 on a client device 10, as shown in block 310. In one embodiment, such a request for a document key is received by a server 20 from a client device 10. In one exemplary context, a client device 10 attempting to open a document 14 may receive authentication information as input from a person using the client device 10 and receive a command to open the document 14. The client device 10 may use this information and information from the document 14 itself, such as a document identifier and license information obtained from an unsecured portion of the document 14, to send a request for a document key to a server 20.

The request may include various information. In the embodiment of FIG. 3, the request comprises an identity of an access policy and information about the document. In one embodiment, the request additionally or alternatively comprises license information. Exemplary license information comprises an identifier of an access policy, a licensed person identifier identifying a person whose access to the document is controlled by the access policy, and a timestamp identifying a time at which security was first applied to the document. License information may include different and/or additional information or combinations of information. The request may additionally and/or alternatively include a user identity of a person requesting access to the document on the client device.

Exemplary method 300 further comprises determining whether access to the document is permitted using an identity of an access policy, as shown in block 320. Such a determination may be performed by server 20 in response to receiving the request for the document key. Determining whether access to the document is permitted may involve identifying a stored record comprising the access policy. The access policy may specify access privileges applicable to one or more documents without specifying access privileges specific to individually-identified documents. Such a stored record may be stored at the server 20, the database 30, or otherwise accessible at the server 30.

Figure 4:
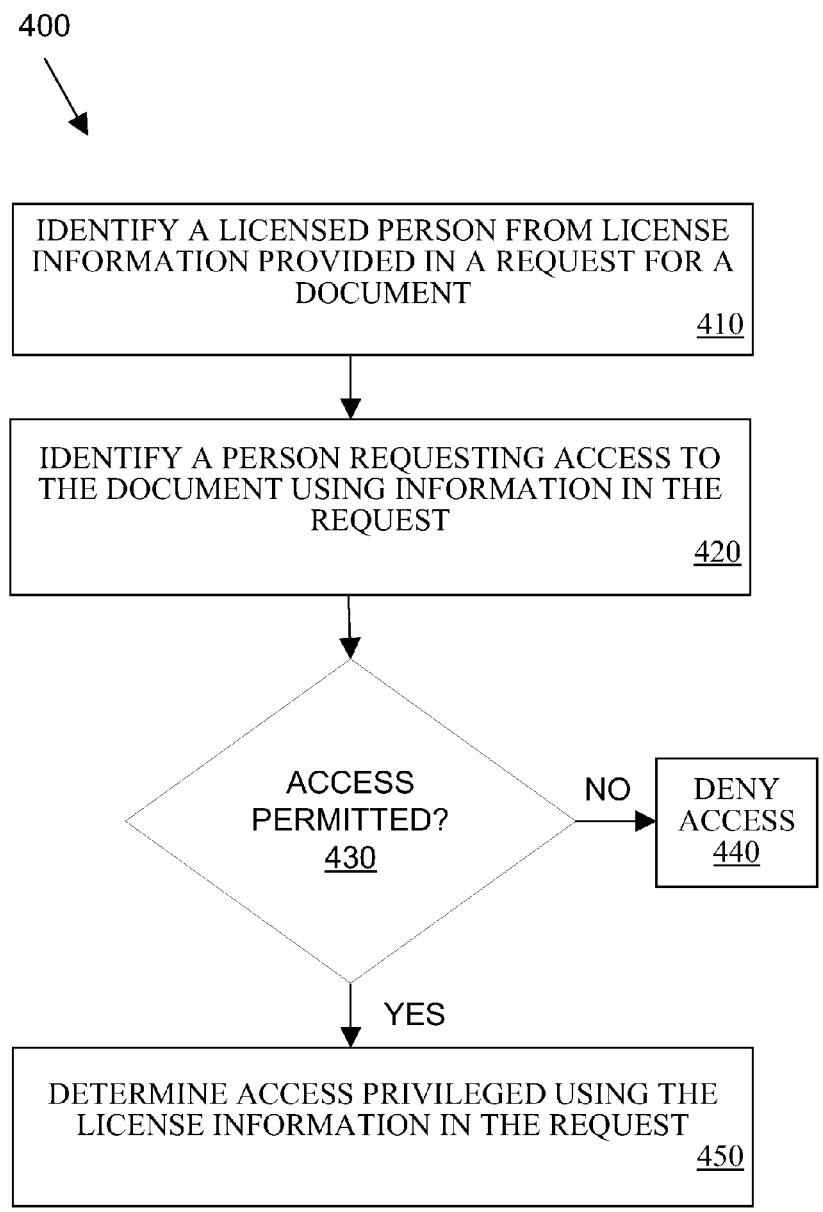
FIG. 4 is a flow chart illustrating an exemplary method of determining whether access to a document is permitted.

FIG. 4 is a flow chart illustrating an exemplary method 400 of determining whether access to the document by the requester is permitted. The exemplary method 400 involves identifying a licensed person from license information provided in a request for a document, as shown in block 410. The method 400 further involves identifying a person requesting access to the document from information provided in the request, as shown in block 420. For example, the identity of such a person may be provided in a request from the client device 10 where the client device received login credentials, e.g., username and password, from a person using the client device 10 to attempt to access a document 14. The exemplary method 400 further comprises determining whether access is permitted, as shown in block 430. As a particular example, such a comparison may involve comparing two pieces of information provided in a request for accessing a document. Examples of such pieces of information are (1) a licensed person identifier in license information provided in the request and (2) an identity of the person requesting access to the document on the client device 10. If the person requesting access is determined to be a person permitted to access the document, i.e., as identified by the licensed person identifier, then access to the document is allowed. If not, access is denied, as shown in block 440.

If access to is permitted, then the method 440 proceeds to block 450 to determine access privileges using the license information in the request, as shown in block 450. Examples of access privileges include, but are not limited to privileges to open, edit, save, print, copy, modify, etc., the document 14. Various combinations of access privileges may be enforced. In one exemplary embodiment, a request includes license information that identifies a particular access policy under which a licensed user may access a document 14. A server 20 may use such an identifier to access one or more stored records on database 30 to identify or otherwise the particular privileges that are applicable. For example, the request may identify policy "X" and the server may retrieve a record for policy "X" that identifies that under the policy the document 14 may be opened but not edited, etc. In one embodiment, wherein determining whether access to a document 14 is permitted comprises identifying a stored record comprising the access policy, where the access policy specifies access privileges applicable to one or more documents without specifying access privileges specific to individually-identified documents and without specifying access privileges specific to individual persons. A stored record providing access privileges and/or other document access information may be stored at the server 20, the database 30, or in any other storage location accessible by the server 20. In various ways, access to a document 14 can be controlled by using a limited number of records or even no records. In one embodiment, document access is controlled without using document-specific access control records.

Returning to FIG. 3, after determining whether access to the document 14 by the requester is permitted, the method 300 performs additional steps if access to the document 14 is permitted. If access to the document is permitted, the method 300 computes the document key using information about the document 14, as shown in block 330. The information in the request to open or otherwise access a document 14 may be used by the receiving server 20 to calculate a document key in various ways. As described previously, the document key may be computed without the server 20 accessing a database 30. The same or similar techniques used to compute the document key when applying a security policy can be used to compute the same document key when access of the document 14 is later requested. The document key may be computed such that the document key is different than document keys determined for other documents. Such variation can be achieved using the information about the document. For example, if such information about the document 14 is the date the document was secured, that date can be used consistently to compute a document key for the document 14 such that the document key for that document 14 will always be the same. Document keys computed for documents secured on different dates can be computed consistently to have different document keys using the difference in dates to provide such differences in the document key computation.

In one embodiment, a document key is computed without the server 20 accessing a stored record comprising document-specific information. In one embodiment, computing a document key comprises forming a unique value that comprises some or all of the information about the document 14 that was received in a request to access the document 14. Computing the document key may involve applying a function to such information. In one embodiment, computing a document key involves applying a function to the information about the document 14 received in a request and using a seed value that is stored at a location accessible to the server 20 that computes the document key. Such a seed value may be retrieved from a record accessible to the server 20. Such a seed value may be used to compute document keys for multiple documents. In one embodiment, computing a document key involves using the information about the document 14 received in a request and a user identity received in the request. For example, the user identity may be used directly or may be used to retrieve a user key that is stored at a location accessible to the server 20 that computes the document key. Such a user identity and/or user key may be used to compute document keys for multiple documents.

If access to the document is permitted, the method 300 responds to the request by providing the document key for use in accessing the document 14 on the client device 10, as shown in block 340. The document key may be provided to the client device 10 from the server 20 such that the client device 10 will use the document key to access the document and then will discard the document key such that to access the document 14 again in the future, the client device 10 will need to again request access to the document from the server 10. In one exemplary embodiment, when a server 20 is accessed by a client device 10 attempting to open a document 14, if the requester is authorized, the server 20 calculates a document key for opening the document 14 and returns that document key to the client device 10. The server 20 may or may not also return policy details specifying what uses of the document 14 are permitted for the requesting person. The client device 20 then decrypts or otherwise opens the document 14 using the document key.

Some embodiments described herein allow a server 20 to limit or eliminate the amount of stored information required to control document access by including some or all of that information in the documents themselves. A system may be configured to reduce or minimize the amount of information that is written to and read from a database 30. A system may even avoid the use of a database 30 altogether. In one exemplary embodiment, access determinations are implemented by a system that stores only policy details for a limited number of access policies such that the number of access policies is less than, and preferably substantially less than, the number of documents and/or licensed persons. In one exemplary embodiment, document key computation features are implemented by a system that stores only a limited number of seed values for computing the document keys where the number of seed values is less than, and preferably substantially less than, the number of documents and/or licensed persons. Stored access policies, seed values, and other information used for access determination and document key computation may be applicable to a large number of document rather than specific documents. A system with reduced storage requirements may provide improved capabilities with respect to efficiency, speed, and scaling, among other benefits.

One embodiment allows for electronic statement documents to be provided for access by particular individual users, i.e., where each a particular document 14 is accessible by only a single person and, possibly, a customer service representative in the event of a problem. A system may be configured to reduce or eliminate having to write document-specific records to database by storing document-specific information into the document 14 itself, e.g., identifying the user, a timestamp, an access policy, and having that information provided to the server 10 when access to the document 14 is later requested. Rather than looking up a document key in a stored record, a server 20 can use the received document-specific information to compute a key that will preferably be unique for the document.

In one embodiment a system is configured so that a server 20 is the only device that computes a document key and/or makes access determinations. In an alternative embodiment, the client device 10 is configured to additionally and/or alternatively compute the document key and/or make access determinations. In another alternative embodiment, the server 20 controls document access when the client device 10 is connected to the network 5, and different techniques, i.e., offline access techniques, are used to control access when the client device 10 is not connected to the network and thus does not have access to server 20. Offline access to a document 14 may be controlled by the client device 10. In one exemplary embodiment, such a document 14 has the document key for the limited purposes of allowing offline access to the document 14. The document key may be included in a protected portion of a document 14 or otherwise secured to prevent unauthorized use of the document key. When a person attempts to use the document 14 offline, a player application 13 may make access determinations and retrieve the document key from the document if appropriate input information (e.g., username and password) is received from the person attempting to access the document. Offline access may be more limited than and/or requires additional verification information from a person requesting access than access that is controlled by a server 20 when the client device 10 is no offline.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:
  receiving, at a server, a request for a document key for accessing a document on a client device, wherein the request comprises:
    an identity of an access policy; and
    information about the document;
  determining, at the server, whether access to the document is permitted according to the access policy by identifying the access policy in a stored record using the identity of the access policy that was received, the access policy specifying access privileges applicable to one or more documents without specifying access privileges specific to individually-identified documents; and
  upon determining that access to the document is permitted:
    computing, at the server, the document key using the information about the document, wherein the document key is document specific, wherein, prior to the computing of the document key, the document key is not stored for access by the server; and
    responding to the request by providing the document key for use in accessing the document on the client device.

2. The method of claim 1 wherein the request comprises license information, wherein the license information comprises:
  the identity of the access policy,
  a licensed person identifier identifying a person whose access to the document is controlled by the access policy, and
  a timestamp identifying a time at which security was first applied to the document.

3. The method of claim 2 wherein the request further comprises an identity of a person requesting access to the document on the client device.

4. The method of claim 3 wherein determining whether access to the document is permitted comprises comparing the licensed person identifier to the identity of the person requesting access to the document on the client device.

5. The method of claim 4 wherein determining whether access to the document is permitted comprises identifying a stored record comprising the access policy, the access policy specifying access privileges applicable to one or more documents without specifying access privileges specific to individually-identified documents and without specifying access privileges specific to individual persons, wherein the stored record is accessible at the server.

6. The method of claim 1 wherein the document key is computed without the server accessing a stored record comprising document-specific information.

7. The method of claim 1 wherein computing the document key comprises forming a unique value that comprises the information about the document.

8. The method of claim 1 wherein computing the document key comprises applying a function to the information about the document.

9. The method of claim 1 wherein computing the document key comprises applying a function to the information about the document and a seed value, wherein the seed value is retrieved from a record accessible to the server, wherein the seed value is used to compute document keys for multiple documents.

10. A system comprising:
- a processor; and
- a non-transitory computer-readable medium communicatively coupled to the processor, wherein the processor is configured to execute program modules tangibly embodied in the non-transitory computer-readable medium to perform operations, the modules comprising:
  - a module for receiving a request for a document key for accessing a document on a client device, wherein the request comprises:
    - an identity of an access policy; and
    - information about the document;
  - a module for determining whether access to the document is permitted according to the access policy by identifying the access policy in a stored record using the identity of the access policy that was received, the access policy specifying access privileges applicable to one or more documents without specifying access privileges specific to individually-identified documents; and
  - a module for computing the document key using the information about the document, wherein the document key is document specific, wherein, prior to the computing of the document key, the document key is not stored for access; and
  - a module for responding to the request, if access to the document is permitted, by providing the document key for use in accessing the document on the client device.

11. The system of claim 10 wherein the request comprises license information, wherein the license information comprises:
- the identity of the access policy,
- a licensed person identifier identifying a person whose access to the document is controlled by the access policy, and
- a timestamp identifying a time at which security was first applied to the document.

12. The system of claim 11 wherein the request further comprises an identity of a person requesting access to the document on the client device.

13. The system of claim 12 wherein the module for determining whether access to the document is permitted is configured to compare the licensed person identifier to the identity of the person requesting access to the document on the client device.

14. The system of claim 13 wherein the access policy specifies access privileges applicable to one or more documents without specifying access privileges specific to individual persons.

15. The system of claim 11 wherein the document key is computed without the server accessing a stored record comprising document-specific information.

16. The system of claim 11 wherein the module for computing the document key is configured to compute the document key by applying a function to the information about the document.

17. The system of claim 11 wherein the module for computing the document key is configured to compute the document key by applying a function to the information about the document and a seed value, wherein the seed value is used to compute document keys for multiple documents.

18. A computer-implemented method comprising:
- receiving, at a server, a request for a document key for accessing a document on a client device, wherein the request comprises:
  - a user identity identifying a requester requesting access to the document;
  - an identity of an access policy; and
  - information about the document;
- determining, at the server, whether access to the document is permitted according to the access policy by identifying the access policy in a stored record using the identity of the access policy that was received, the access policy specifying access privileges applicable to one or more documents without specifying access privileges specific to individually-identified documents; and
- upon determining that access to the document is permitted:
  - computing, at the server, the document key using the information about the document and using the user identity, wherein the document key is document specific, wherein, prior to the computing of the document key, the document key is not stored for access by the server; and
  - responding to the request by providing the document key for use in accessing the document on the client device.

* * * * *